No. 729,811. PATENTED JUNE 2, 1903.
E. THOMSON.
SYSTEM OF ELECTRIC METERING.
APPLICATION FILED MAR. 21, 1898.
NO MODEL.
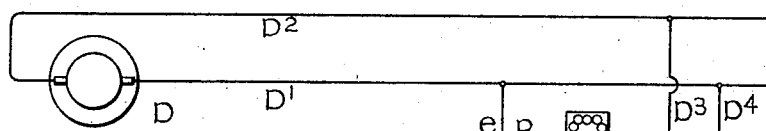
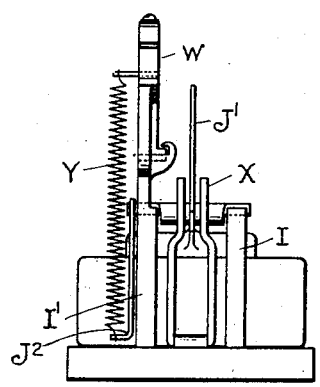
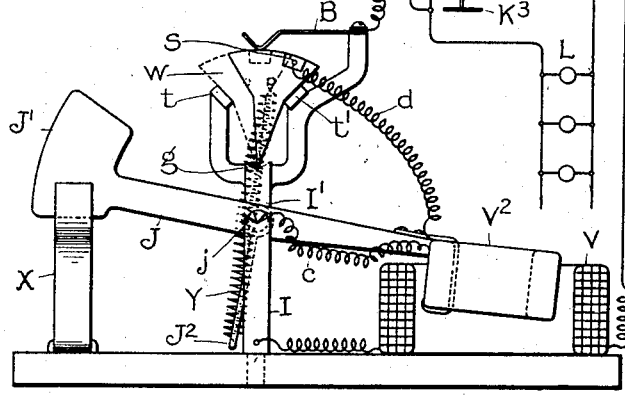
WITNESSES.
Lewis P. Abell.
A. F. Macdonald.
INVENTOR.
Elihu Thomson,
by Albert G. Davis
Atty No. 729,811. Patented June 2, 1903.

UNITED STATES PATENT OFFICE.

ELIHU THOMSON, OF SWAMPSCOTT, MASSACHUSETTS, ASSIGNOR TO THE GENERAL ELECTRIC COMPANY, A CORPORATION OF NEW YORK.

SYSTEM OF ELECTRIC METERING.

SPECIFICATION forming part of Letters Patent No. 729,811, dated June 2, 1903.

Application filed March 21, 1898. Serial No. 674,606. (No model.)

*To all whom it may concern:*

Be it known that I, ELIHU THOMSON, a citizen of the United States, residing at Swampscott, in the county of Essex, State of Massachusetts, have invented certain new and useful Improvements in Systems of Electric Metering, of which the following is a specification.

In order to render certain types of electric meters positive in their action, it is customary to provide them with a potential-coil through which a certain amount of current passes and to mount this coil within the influence of a field-magnet the strength of which varies with the load on the system to be metered. In the majority of meters this potential-coil is permanently connected in circuit and the current flowing through this coil represents a certain loss of energy. This loss may when the load on the system at the point of consumption is light represent a considerable fraction of the total energy supplied to the consumer. This is particularly noticeable where the consumer requires current for a few hours each day and then has only a small number of translating devices in circuit.

My invention has for one of its objects to increase the efficiency of the meter by reducing the loss of current due to the potential-coil, at the same time preserving the accuracy of the meter registration. To accomplish this, the circuits of the meter are arranged in such manner that current instead of being permitted to flow through the potential-coil at all times is restricted to certain definite intervals. The intervals in which current is permitted to flow in the potential-coil may bear any desired relation to the intervals in which the circuit is interrupted. For example, the current may be cut off for nine-tenths of the time and permitted to flow during the remaining tenth, in which case the meters will register with sufficient accuracy; but their registry will only be about one-tenth what it would have been if current had been flowing all the time. If the intervals of making and breaking the circuit are not too great, the meter-readings will be accurately proportional to the energy consumed, and by properly adjusting the registering mechanism the actual energy consumed may be indicated. I effect this result by providing in the circuit of the potential-coil of the meter an improved type of current-interrupter by which the potential-coil is connected in circuit only for a small interval of time, being out of circuit the rest of the time, thereby permitting the meter only to record at close periodic intervals—say, for a fractional part of each consecutive minute of time—the periods being so short that no material error in the registration of the meter will result by reason of an increase or decrease of current consumption by the translating devices. The current-interrupter by which I effect this result comprises novel features and consists of an electrically-actuated device controlling a snap-switch, by which a quick break of the circuit is effected and a long range of movement given to prevent interference from arcing. The operation of the snap-switch is controlled by a vibratory device electrically operated in one direction and provided with a damping mechanism for slowly returning it to the point where electrical influence can again be exerted.

The novel features of the invention will be more particularly hereinafter described, and will be definitely indicated in the claims appended to this description.

In the accompanying drawings, which illustrate my invention, Figure 1 is a diagram of a metering system embodying my improvements, including my improved current-interrupter for the potential-circuit. Fig. 2 is a side elevation of the current-interrupter.

$D'$ and $D^2$ represent a supply-circuit leading from the supply-generator D, and $D^3$ $D^4$ represent the leads to a consumer's premises, including a group of lamps L or other current-consuming devices.

I have shown my invention as applied to a type of meter such as the well-known Thomson recording-wattmeter, though, as will be evident to those familiar with the art, it may be employed with other types of meter.

As shown in the diagram, in series relation to the translating devices are the current-coils of the meter, forming a field within which rotates an armature K, geared to the counter, said armature being included in a potential shunt across the mains, including a resistance R and the coils of the armature K, to which current is led through a commutator, as indicated. A damping-disk $K^3$ on the armature-shaft, mounted in the usual manner, slows down the speed of the armature. In the potential-circuit in which the armature is included I place the operating-coils V $V^2$ of my improved interrupter. These are so connected that when current passes the coils will mutually repel each other. The coil $V^2$ is mounted on a bar supported on a knife-bearing $j$, the free end $J'$ swinging between the poles of a permanent magnet X.

Supported on a standard $I'$ by means of a knife-bearing, as indicated at $g$, is a sector W, the upper face of which is of insulating material and into which is set a short contact-segment S, or, if desired, the entire sector may be made of insulating material except the contact S and the bearing. This sector is placed between two stops $t\ t'$, mounted on arms or brackets secured to the standard. A metallic contact-spring B is mounted so as to bear against the upper face of the sector and is connected by a wire $e$ with one side of the potential-circuit. The contact S connects by a flexible conductor with one terminal of the coil $V^2$, the other terminal of said coil being in electrical connection with a terminal of the coil V, the other terminal of which connects with one of the brushes of the commutator of the meter-motor. The rocking lever J carries an arm $J^2$, to which is connected a coil-spring Y, the other end of which is secured to a pin mounted on the sector W, the points of connection being so chosen that the movements of the lever J, under the influence of the mutual repulsion of the coils in one direction and of gravity or a spring in the opposite direction, will shift the axial line of the coil-spring Y on one side or the other of the knife-bearing $g$.

As shown in the drawings, the parts are in a position where gravity has just effected the return of the coil $V^2$ and the arm $J^2$ has been just shifted so as to bring the center line of the spring beyond the knife-bearing to the left. The parts are therefore in a position to draw the sector W to the left and close the circuit, when the sector will occupy the position shown in dot. A potential-circuit will then be made through the armature of the meter-motor and through the coils V $V^2$, energizing the latter and effecting the repulsion of the coil $V^2$, thereby shifting the arm $J^2$ to the right until the axial line of the spring passes the knife-bearing, when the sector will be snapped to the right, thereby opening the circuit and quickly separating the contacts B and S. The lever will then settle under the preponderating weight of the coil $V^2$, and slowly, by reason of the damping action of the magnet X, to the position shown in the drawings, when the cycle of operations just traced will be repeated. Thus it will be seen that the circuit of the potential-coil of the armature is closed only for a part of the time, (while the contacts B and S are in engagement,) during which time the meter will register. At all other times the potential-circuit of the meter is open and registration is not effected. Obviously the relative length of time during which the potential-coil of the meter is in circuit and out depends upon the preponderating effect of the coil $V^2$ and the damping action of the magnet X and can be adjusted through a considerable range, which may be varied by giving the sector a greater or less play between its arresting-stops, by altering the relation of the damper X and the preponderating weight of the coil $V^2$, and by changing the position of the arm $J^2$ with relation to the knife-bearing. Thus there results a continuous slow vibration of the lever J and a periodic interruption of the armature-circuit, reducing the amount of energy consumed thereby.

While I have shown and described my interrupter in connection with an electric metering device, it will of course be understood that it may be applied to other purposes where a slow and definite periodic interruption of an electric circuit is desired.

What I claim is—

1. In an electric metering system, the combination of a consumption-circuit, a meter-motor controlled thereby, and an electrically-operated current-interrupter controlling the meter-motor and closing it at regularly-recurring intervals during operation of a translating device in said consumption-circuit.

2. In an electric metering system, the combination of a consumption-circuit, and a meter-motor controlled thereby, one of the operative circuits of the motor including an electrically-operated current-interrupter closing the circuit at regularly-recurring intervals during the operation of a translating device in said consumption-circuit.

3. In an electric metering system, the combination of a consumption-circuit, a meter-motor having one circuit in series with a translating device, a potential-circuit on the motor, and an electrically-operated current-interrupter in the potential-circuit opening it intermittently during consumption of current in the circuit.

4. In an electric metering system, the combination of a consumption-circuit, a meter-motor having one circuit in series with the translating devices, a potential-circuit on the motor, and an electrically-operated current-interrupter in the potential-circuit, adjusted to hold the circuit open for longer intervals than closed.

5. An automatic current-interrupter, comprising contacts, means for opening and closing the same, and a magnetic damper to effect a slow movement.

6. An automatic current-interrupter comprising contacts, an electric vibrator, and a magnetic damper for slowing its movements.

7. An automatic current-interrupter comprising contacts, a vibrator for opening and closing the same, electric controlling devices for moving the vibrator in one direction, means for slowly returning it, and a damper for slowing the movements of the vibrator.

8. An automatic current-interrupter comprising an electrically-operated vibrator, a snap-switch operated thereby at each movement of the vibrator, and a magnetic damper to retard the vibrator movements.

9. An automatic current-interrupter, comprising a rocking contact, a spring connected thereto, and a coil to shift the axis of the spring to opposite sides of the pivotal point of the contact.

10. An automatic current-interrupter for intermittently opening and closing a circuit, comprising a movable contact, a coil for quickly opening the contact, a counterbalanced lever for slowly closing the contact, and a magnetic damper for slowing the movement of the lever.

11. The combination of stationary field-coils through which the whole or a portion of the current to be measured passes, an armature mounted for rotary movement with respect to the field-coils and influenced by the potential of the system, the coils and armature uniting to form a single metering device, and automatic means controlled by the current flowing in the system, but uninfluenced by the meter, for interrupting the armature-circuit at predetermined recurring intervals during the flow of current to be measured.

12. In an electric measuring instrument, the combination of a field-magnet, a single armature mounted for movement with respect to the field-magnet, and an automatic electromagnetically-actuated circuit-breaker separate from the meter for periodically opening and closing the armature-circuit at regularly-recurring intervals during the flow of current to be measured.

13. In an electric measuring instrument, the combination of a field-magnet, an armature mounted for movement with respect to the field-magnet, a circuit-breaker independent of the meter parts, comprising a fixed and a moving coil, and a switch actuated by the moving coil.

14. In a circuit-breaker for an electric meter, the combination of a stationary coil, a moving coil so related to the stationary coil as to be affected by current flowing therein, damping mechanism, and a switch actuated by the moving coil; the arrangement being such that the circuit of the meter is interrupted at predetermined intervals, independent of the amount of current flowing in the system.

15. In a circuit-breaker, the combination of a stationary coil, a moving coil connected in circuit therewith, a pivoted lever carrying the coil at one end and a damping device at the other, a pivoted switch-piece, and a spring controlled by the moving coil for actuating the switch-piece.

16. In an automatic circuit-breaker for opening and closing a circuit, the combination of a fixed and a moving coil, a switch for making and breaking said circuit, and means actuated by the moving coil of the breaker for actuating the switch, the said means being arranged to definitely and periodically open and close the circuit, the interval of time in which the circuit is closed being of less duration than the time it is open.

17. The combination with an electrical measuring instrument, of a circuit-breaker for maintaining a periodic opening and closing of a circuit comprising a contact for closing an electric circuit, a coil of constant potential and a coöperating member therefor controlling the action of the contact, and means for retarding the closing of the contact so that the interval of circuit-closure is of less duration than the interval during which it is open.

In witness whereof I have hereunto set my hand this 14th day of March, 1898.

ELIHU THOMSON.

Witnesses:
DUGALD MCKILLOP,
JOHN MCMANUS.